United States Patent
Ludwig et al.

(10) Patent No.: US 10,261,180 B2
(45) Date of Patent: Apr. 16, 2019

(54) METHOD FOR REJECTING ECHO SIGNALS FROM A TRAILER APPARATUS ON A MOTOR VEHICLE, DRIVER ASSISTANCE DEVICE AND MOTOR VEHICLE

(71) Applicant: VALEO Schalter und Sensoren GmbH, Bietigheim-Bissingen (DE)

(72) Inventors: Michael Ludwig, Mannheim (DE); Ulrich Bressler, Bietigheim-Bissingen (DE); Zbyszek Jarzabek, Bietigheim-Bissingen (DE)

(73) Assignee: VALEO Schalter und Sensoren GmbH, Bietigheim-Bissingen (DE)

( * ) Notice: Subject to any disclaimer, the term of this patent is extended or adjusted under 35 U.S.C. 154(b) by 219 days.

(21) Appl. No.: 15/320,367

(22) PCT Filed: May 22, 2015

(86) PCT No.: PCT/EP2015/061380
§ 371 (c)(1),
(2) Date: Dec. 20, 2016

(87) PCT Pub. No.: WO2015/193060
PCT Pub. Date: Dec. 23, 2015

(65) Prior Publication Data
US 2017/0160395 A1 Jun. 8, 2017

(30) Foreign Application Priority Data

Jun. 21, 2014 (DE) .................. 10 2014 009 177

(51) Int. Cl.
*G01S 15/00* (2006.01)
*G01S 15/93* (2006.01)
*G01S 7/52* (2006.01)

(52) U.S. Cl.
CPC ........ *G01S 15/931* (2013.01); *G01S 7/52004* (2013.01); *G01S 2007/52009* (2013.01); *G01S 2015/938* (2013.01)

(58) Field of Classification Search
None
See application file for complete search history.

(56) References Cited

U.S. PATENT DOCUMENTS

2003/0151541 A1* 8/2003 Oswald ................. G01S 13/931
342/70
2007/0008819 A1 1/2007 Diessner et al.

FOREIGN PATENT DOCUMENTS

CN 2518734 Y 10/2002
DE 34 20 004 A1 12/1985
(Continued)

OTHER PUBLICATIONS

Notice of Preliminary Rejection issued in corresponding Korean Application No. 2016-7035510, dated Jun. 1, 2018 (8 pages).
(Continued)

*Primary Examiner* — Hovhannes Baghdasaryan
(74) *Attorney, Agent, or Firm* — Osha Liang LLP

(57) ABSTRACT

The invention relates to a method for operating an ultrasonic sensor apparatus (3) having a multiplicity of ultrasonic sensors (5, 6, 7) arranged in the rear region (4) of a motor vehicle (1) in which the ultrasonic sensor apparatus (3) is used to perform detection of an object (11) in the surroundings of the motor vehicle (1), wherein a first ultrasonic sensor (6), in an object detection mode for detecting an object (11) that is different from a trailer apparatus (10) arranged in the rear region (4), is operated only for the purpose of receiving echo signals from transmission signals transmitted by at least one other ultrasonic sensor (5, 7), and the sending of transmission signals from this first ultrasonic
(Continued)

Figure 1:
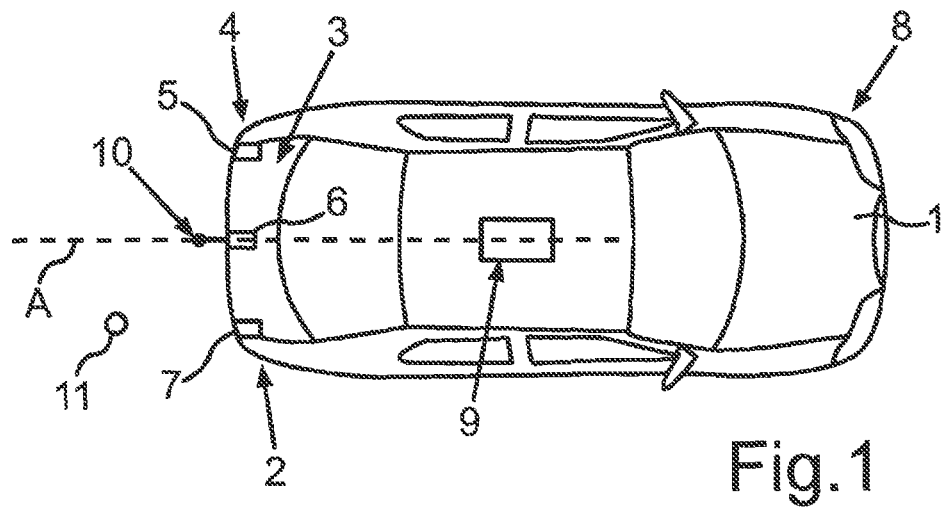

sensor (6) is prevented. The invention also relates to a driver assistance device (2) and a motor vehicle (1).

9 Claims, 1 Drawing Sheet

(56) References Cited

FOREIGN PATENT DOCUMENTS

| | | |
|---|---|---|
| DE | 10 2011 101 013 A1 | 11/2012 |
| DE | 10 2012 015517 A1 | 2/2014 |
| EP | 0 610 702 A2 | 8/1994 |
| EP | 2 523 015 A1 | 11/2012 |
| GB | 2 305 287 A | 4/1997 |
| KR | 20130010716 A | 1/2013 |
| KR | 20140044214 A | 4/2014 |

OTHER PUBLICATIONS

The First Office Action issued in corresponding Chinese Application No. 201580033590.0, dated Aug. 3, 2018 (8 pages).
International Search Report issued in PCT/EP2015/061380, dated Aug. 19, 2015 (2 pages).
Written Opinion of the International Searching Authority issued in PCT/EP2015/061380, dated Aug. 19, 2015 (6 pages).
German Search Report issued in DE 10 2014 009 177.5 dated Oct. 21, 2014 (7 pages).

\* cited by examiner

METHOD FOR REJECTING ECHO SIGNALS FROM A TRAILER APPARATUS ON A MOTOR VEHICLE, DRIVER ASSISTANCE DEVICE AND MOTOR VEHICLE

The invention relates to a method for rejecting echo signals from a trailer apparatus on a rear region of a motor vehicle in which an ultrasonic sensor apparatus having a plurality of ultrasonic sensors is arranged in the rear region, and the ultrasonic sensor apparatus is used to perform detection of an object in the surroundings of the motor vehicle. Furthermore, the invention relates to a driver assistance device and to a motor vehicle having such a driver assistance device.

Driver assistance devices, such as a parking assistance system or an ACC (Adaptive Cruise Control) system, for example, are known. Driver assistance systems of this kind usually comprise an ultrasonic sensor apparatus that is arranged on the motor vehicle and uses ultrasonic sensors to detect the surroundings of the motor vehicle, for example to determine whether objects are detected that are in the way for the motor vehicle to move along further.

An ultrasonic sensor is known to send a transmission signal that is a sound signal. The transmission signal is then reflected from obstacles or objects and is received again by the ultrasonic sensor, namely as an echo. On the basis of the received echo, it is possible to determine the distance between the object and the motor vehicle. In this case, the distance is ascertained on the basis of a delay in the echo, wherein, in this case, a period of time between the transmission time and the reception time is measured. This so-called direct measurement is therefore based on transmission of a transmission signal and reception of an echo signal in this respect by the same ultrasonic sensor. Furthermore, it is also known practice to perform a so-called indirect measurement. This measurement involves a transmission signal being transmitted by an ultrasonic sensor, reflected from an object, and the echo in this respect being received by another ultrasonic sensor of the ultrasonic sensor apparatus.

A problem can arise when there are elements arranged on the vehicle, such as a trailer towing apparatus or a trailer coupling, for example. From the point of view of the ultrasonic sensor, such an element is a real object to be detected. The ultrasonic signals are reflected by this trailer apparatus and received by the ultrasonic sensor.

Figure 2:
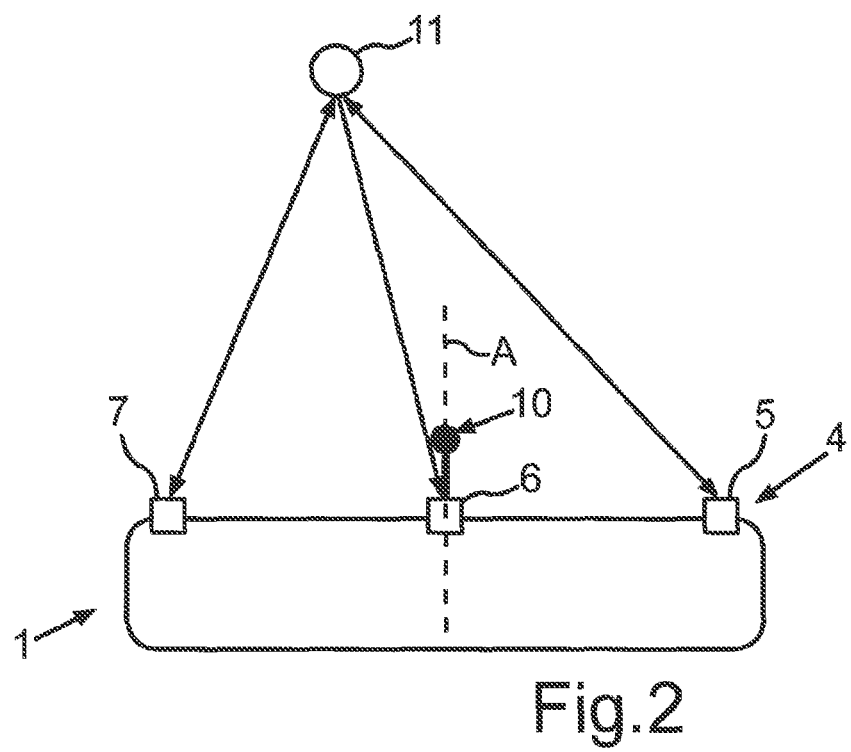

DE 10 2011 101 013 A1 discloses a motor vehicle in which a rear region has four ultrasonic sensors arranged in it. In the projection view, as shown in FIG. 1 and FIG. 2, said ultrasonic sensors are arranged so as to be staggered in relation to a vehicle longitudinal axis that runs through a trailer coupling arranged there in the rear region, in particular are arranged symmetrically. The distances from the ultrasonic sensors to the trailer coupling are relatively great in this case, which means that although there is shadowing by the trailer coupling, it is relatively minor and hence this shadowing can be filtered out in a relatively simple manner in the signal processing.

Furthermore, embodiments are known in which the rear region of the vehicle has one of the ultrasonic sensors arranged in it precisely on such a longitudinal axis on which the trailer coupling is also located. This is known from EP 0 610 702 A2, for example. In these embodiments, the distance from the ultrasonic sensor located on this axis to the trailer coupling is very short and the shadowing of the trailer coupling is relatively great. In this case, a large number of echo reflections are produced with the transmitted signal from this ultrasonic sensor. Owing to the large number of echo reflections as a result of the trailer coupling, practically all other echo signals are overlaid. The useful signals cannot be filtered out without difficulty. Usually, such systems require the driver assistance device to be switched off when there is such a trailer apparatus in the rear region, so as in this respect not to undesirably obtain distorted information, and, by way of example, be able to perform a parking manoeuvre under the control of the system only inadequately.

It is an object of the present invention to provide a method, a driver assistance device and a motor vehicle in which or with which it is possible to improve operation of the ultrasonic sensor apparatus with a trailer apparatus on the motor vehicle.

This object is achieved by a method, a driver assistance device and a motor vehicle according to the independent claims.

In a method according to the invention for rejecting echo signals from a trailer apparatus on a rear region of a motor vehicle, an ultrasonic sensor apparatus having a plurality of ultrasonic sensors is arranged in the rear region, and the ultrasonic sensor apparatus can be used to detect an object in the surroundings of the motor vehicle. An essential concept of the invention can be regarded as being that a first ultrasonic sensor of the ultrasonic sensors arranged in the rear region, in an object detection mode for detecting an object that is different from a trailer apparatus arranged in the rear region, is operated only for the purpose of receiving echo signals from transmission signals transmitted by at least one other ultrasonic sensor, and the sending of transmission signals from this first ultrasonic sensor is prevented. Thus, in situations in which a trailer apparatus is installed on a motor vehicle in the rear region, a—in this respect—closest ultrasonic sensor of the ultrasonic sensor apparatus is operated not in a transmission mode but rather only in a reception mode. This first ultrasonic sensor therefore does not transmit ultrasonic signals of its own, but rather receives only echo signals that are reflected transmission signals from the other ultrasonic sensors of the ultrasonic sensor apparatus. Such operation operates this first ultrasonic sensor not in the direct mode but rather only in the indirect mode. This prevents no echo signals from its own transmitted transmission signals from arising, since it fundamentally does not transmit transmission signals in this object detection mode. False detection of the trailer coupling as an object in the surroundings of the vehicle is therefore prevented specifically in the case of such configurations. This first ultrasonic sensor is the ultrasonic sensor of the ultrasonic sensors arranged in the rear region that is at the shortest distance from the trailer apparatus. This first ultrasonic sensor is arranged on the rear region particularly such that it is arranged centrally with regard to the width direction of the rear region, the trailer apparatus also being arranged centrally in the width direction of the rear region. Starting from the first ultrasonic sensor and the trailer apparatus, these two components are therefore, when viewed in this width direction, situated centrally and hence on the centrally situated longitudinal axis of the motor vehicle. The trailer coupling may preferably be situated essentially in the main transmission direction of the first ultrasonic sensor.

Preferably, the first ultrasonic sensor is arranged on the rear region such that, in a projection into a horizontal plane, it is situated at least essentially on a longitudinal axis of a trailer apparatus arranged in the rear region of the motor vehicle. Specifically in the case of such configurations, the aforementioned problems come essentially to the fore, so that, specifically for these configurations, it is essentially advantageous for the first ultrasonic sensor to be operated in accordance with the invention. Since these configurations involve there being a particularly short distance between the first ultrasonic sensor and the trailer apparatus, an exclusive reception mode for this first ultrasonic sensor can prevent a large number of echo signals from a transmission signal from the first ultrasonic sensor that it has transmitted itself.

Preferably, the at least one other ultrasonic sensor is operated to the effect that it transmits a transmission signal that is also reflected from the trailer apparatus as a trailer apparatus echo signal. This trailer apparatus echo signal is received by the first ultrasonic sensor and filtered out on evaluation of the echo signals received from an object in the surroundings of the motor vehicle. Thus, it is then rendered a relatively simple matter to identify undesired echo signals of this kind from the trailer apparatus and to ignore them for the evaluation of whether and, if appropriate, where an object is located in the surroundings of the vehicle. In the case of this configuration, the at least one other ultrasonic sensor is therefore operated such, or is arranged and designed such, that a sound lobe of a transmission signal or the cone of the transmission signals is oriented such that it also covers the trailer apparatus, or the latter is situated in this transmission region. This configuration therefore stipulates a relatively large or wide transmission cone for the other ultrasonic sensors, so that, in this case, it is also possible for a very large region in the rear region of the vehicle to be covered and detected. Although trailer apparatus echo signals are then also obtained as a result, they can then be filtered out and identified in a simple manner and hence a high level of detection accuracy for an object external to the motor vehicle can be achieved even when the detection region of the ultrasonic sensor apparatus also has elements that are fixed to the vehicle arranged in it.

In an advantageous alternative embodiment, the first ultrasonic sensor is operated for the purpose of receiving echo signals only when a previously known period of time between a transmission of a transmission signal from the other ultrasonic sensor and an arrival of a trailer apparatus echo signal, reflected therefor from the trailer apparatus, for this transmission signal has elapsed. Such a mode again takes the information, already cited above and stored anyway, concerning the distances of the ultrasonic sensors from one another and the distances of the ultrasonic sensors from the trailer apparatus as a basis for actively starting the reception mode of the first ultrasonic sensor only when a period of time has elapsed that is determined from the transmission of a transmission signal from another ultrasonic sensor up to a possible arrival of an echo in this respect from the trailer apparatus at the first ultrasonic sensor. This configuration fundamentally prevents such trailer apparatus echo signals from being detected by the first ultrasonic sensor and then, following this, needing to be identified and filtered out in the signal processing or in another way. This configuration therefore reduces the processing complexity for the signals.

In a particularly advantageous embodiment, the rear region of the motor vehicle has only three ultrasonic sensors arranged on it. This is a very minimalistic configuration that nevertheless allows object detection to be performed in the surroundings of the motor vehicle. In this configuration, the symmetrical arrangement then means that it is more or less always the case that the middle ultrasonic sensor comes to rest on a longitudinal axis of the trailer coupling, which also extends in longitudinal direction of the motor vehicle, when a projection view of this first ultrasonic sensor and of the trailer apparatus is provided in a horizontal plane.

Furthermore, the invention relates to a driver assistance device having an ultrasonic sensor apparatus that has a multiplicity of ultrasonic sensors arranged in the rear region of a motor vehicle. These ultrasonic sensors can be used to perform detection of an object in the surroundings of the motor vehicle. A fundamental concept of the driver assistance device according to the invention can be regarded as being that a first ultrasonic sensor of the ultrasonic sensors arranged in the rear region, in an object detection mode for detecting an object that is different from a trailer apparatus arranged on the rear region, is operated only for the purpose of receiving echo signals from transmission signals transmitted by at least one other ultrasonic sensor, and the sending of transmission signals from this first ultrasonic sensor itself is prevented or deactivated. The advantages achievable in this respect have already been cited for the method according to the invention.

Preferably, the first ultrasonic sensor is arranged on the rear region such that, in a projection into a horizontal plane, it is situated at least essentially on a longitudinal axis of a trailer apparatus arranged in the rear region of the motor vehicle. In this case too, the advantages have already been cited above.

Preferably, the rear region of the vehicle has only three ultrasonic sensors arranged on it, so that a system that is minimalistic in this respect is produced.

Furthermore, the invention also relates to a motor vehicle having a driver assistance device according to the invention or an advantageous configuration thereof. In this context, advantageous embodiments of the method according to the invention can also be regarded as advantageous embodiments of the driver assistance device according to the invention, wherein the corresponding components of the driver assistance device are, to this end, alone or in combination, designed to perform the respective method steps.

Further features of the invention will emerge from the claims, the figures and the description of the figures. The features and combinations of features cited in the description above, and the features and combinations of features cited in the description of the figures below and/or shown in the figures alone, can be used not only in the respectively indicated combination but also in other combinations or on their own without departing from the scope of the invention. Therefore, embodiments of the invention that are not explicitly shown and explained in the figures, but emanate and are producible from the explained embodiments by virtue of self contained combinations of features, are also intended to be regarded as included and as disclosed.

Exemplary embodiments of the invention are explained in more detail below with reference to schematic drawings, in which:

FIG. 1 shows a plan view of an exemplary embodiment of a motor vehicle according to the invention; and FIG. 2 shows a plan view of the rear region of the motor vehicle according to FIG. 1 in a schematic representation.

In the figures, elements that are the same or that have the same function are provided with the same reference symbols.

FIG. 1 shows a plan view of a motor vehicle 1 that has a driver assistance device 2. The driver assistance device 2 may, by way of example, be a parking assistance system or an ACC system. The driver assistance device 2 comprises, to this end, an ultrasonic sensor apparatus 3 that has, in a rear region 4 of the motor vehicle 1, a plurality of ultrasonic sensors 5, 6 and 7 and hence, in the exemplary embodiment, comprises only three ultrasonic sensors 5 to 7.

The ultrasonic sensor apparatus 3 may particularly also have, beyond this, in a front region 8 of the motor vehicle 1, further ultrasonic sensors.

The driver assistance device 2 furthermore comprises a control unit 9 that is connected to the ultrasonic sensor apparatus 3, and particularly to the ultrasonic sensors 5 to 7, for the purpose of communication, and that, on the basis of the provided function of the driver assistance device 2, takes the information that is at least obtained from the ultrasonic sensors 5 to 7 as a basis for performing a semiautonomous or fully autonomous parking manoeuvre for the motor vehicle 1 or slowing-down of the motor vehicle 1, for example. The functionality of the driver assistance device 2 is not just limited to a parking assistance system or an ACC system, rather the driver assistance device 2 may also be configured otherwise in functional terms.

In the embodiment shown, the middle first ultrasonic sensor 6 is located on a longitudinal axis A of the motor vehicle 1, this longitudinal axis also representing a longitudinal axis of a trailer apparatus 10 that is permanently arranged in the rear region 4. In the projection into a horizontal plane that is shown in FIG. 1, this first ultrasonic sensor 6 is therefore situated on the longitudinal axis A and hence also on the longitudinal axis of the trailer apparatus 10, which may be a trailer coupling. In other words, the trailer coupling is situated essentially in the main transmission direction of the first ultrasonic sensor 6.

The ultrasonic sensors 5 to 7 are designed for detecting an object 11 in surroundings of the motor vehicle 1.

Particularly the control unit 9 also stores information that comprises the distance of the ultrasonic sensors 5 to 7 from one another. Similarly, distances of the ultrasonic sensors 5 to 7 from the trailer apparatus 10 are stored here.

There is provision for the first ultrasonic sensor 6 to be operated only in a reception mode. This means that it does not transmit transmission signals of its own, but rather is operated merely for the purpose of receiving echo signals. When the other ultrasonic sensors 5 and 7 perform transmission of transmission signals, therefore, which are then reflected from the object 11, they are received by the first ultrasonic sensor 6.

In the exemplary embodiment, there is also provision for the other ultrasonic sensors 5 and 7 to have a transmission cone that is such that the transmitted transmission signals can also reach the trailer apparatus 10 and can be reflected at that point. These transmission signals that are then reflected from the trailer apparatus 10 are then trailer apparatus echo signals, which can likewise be received by the first ultrasonic sensor 6 in its subsequent reception mode. This is the case when the reception mode of the first ultrasonic sensor 6 takes place, and hence this mode is active, even when the period of time from transmission of a transmission signal from another ultrasonic sensor 5 and/or 7 up to arrival of a trailer apparatus echo signal at the first ultrasonic sensor 6 has not yet elapsed. In such a configuration, following this, the filtering-out of these trailer apparatus echo signals, for example, is then performed by the control unit 9, for example, so as then to be able to obtain the actual detection of the object 11 in a precise and correct manner and distinguish it from the trailer apparatus 10.

However, there may also be provision for the active reception mode of the first ultrasonic sensor 6 to take place only when a period of time from a transmission of a transmission signal from another ultrasonic sensor 5 and/or 7 and an arrival of a trailer apparatus echo signal in this respect at the first ultrasonic sensor 6 has elapsed. In such a mode, there are then fundamentally no trailer apparatus echo signals received by the first ultrasonic sensor 6 in a reception mode.

FIG. 2 shows an enlarged representation of the rear region 4 of the motor vehicle 1. The other sensors 5 and 7 are designed both for sending transmission signals and for receiving echo signals. In this context, they can particularly each receive echo signals from their own transmission signals, as have been reflected from the object 11. There may also be provision for them to additionally receive echo signals that are transmission signals from the respective other ultrasonic sensor 5 or 7, which have then been reflected from the object 11. Accordingly, this can also then take place with signals that have been reflected from the trailer apparatus 10, said signals then being able to be filtered out again by the subsequent signal processing. The arrow representation in FIG. 2 also outlines that the first ultrasonic sensor 6 is operated only for the purpose of receiving echo signals and does not transmit transmission signals of its own when the driver assistance system or the driver assistance device 2 is actively operated and the trailer apparatus 10 is present.

The invention claimed is:

1. A method for rejecting echo signals from a trailer apparatus on a rear region of a motor vehicle, in which an ultrasonic sensor apparatus having a plurality of ultrasonic sensors is arranged in the rear region, the method comprising:

detecting, by the ultrasonic sensor apparatus an object in the surroundings of the motor vehicle, wherein a first ultrasonic sensor of the ultrasonic sensors is arranged in the rear region such that, in a projection into a horizontal plane, the first ultrasonic sensor is situated at least substantially on a longitudinal axis of the trailer apparatus arranged in the rear region of the motor vehicle; and in an object detection mode for detecting an object that is different from the trailer apparatus arranged in the rear region, the first ultrasonic sensor is operated only for the purpose of receiving echo signals from transmission signals transmitted by at least one other ultrasonic sensor, preventing sending of transmission signals from the first ultrasonic sensor.

2. The method according to claim 1, wherein the at least one other ultrasonic sensor transmits a transmission signal that is also reflected from the trailer apparatus as a trailer apparatus echo signal, wherein the trailer apparatus echo signal is received by the first ultrasonic sensor and is filtered out on evaluation of the echo signals received from an object.

3. The method according to claim 2, wherein the trailer apparatus echo signal is distinguished from an echo signal from an object on the basis of a period of time between transmission of a transmission signal by the at least one other ultrasonic sensor and reception of the trailer apparatus echo signal by the first ultrasonic sensor.

4. The method according to claim 1, wherein the first ultrasonic sensor is operated for the purpose of receiving echo signals only when a previously known period of time between transmission of a transmission signal from the other ultrasonic sensor and an arrival of a trailer apparatus echo signal, reflected therefor from the trailer apparatus, for this transmission signal has elapsed.

5. The method according to claim 1, wherein the rear region has only three ultrasonic sensors arranged on the rear region.

6. A driver assistance device comprising:
an ultrasonic sensor apparatus comprising a plurality of ultrasonic sensors arranged in a rear region of a motor vehicle in which the ultrasonic sensor apparatus is used to perform detection of an object in the surroundings of the motor vehicle,
wherein:
a first ultrasonic sensor of the plurality of ultrasonic sensors arranged in the rear region, in an object detection mode for detecting an object that is different from a trailer apparatus arranged in the rear region, is operated only for a purpose of receiving echo signals from transmission signals transmitted by at least one other ultrasonic sensor, and wherein, during the object detection mode, the sending of transmission signals from the first ultrasonic sensor is prevented, and
the first ultrasonic sensor is arranged in the rear region such that, in a projection into a horizontal plane, the first ultrasonic sensor is situated at least essentially on a longitudinal axis of the trailer apparatus arranged in the rear region of the motor vehicle.

7. The driver assistance device according to claim 6, wherein the rear region has only three ultrasonic sensors arranged on the rear region.

8. A motor vehicle having a driver assistance device according to claim claim 6.

9. A method for rejecting echo signals from a trailer apparatus on a rear region of a motor vehicle, in which an ultrasonic sensor apparatus having a plurality of ultrasonic sensors is arranged in the rear region, the method comprising:
detecting, by the ultrasonic sensor apparatus an object in the surroundings of the motor vehicle,
wherein a first ultrasonic sensor of the ultrasonic sensors is arranged in the rear region; and
in an object detection mode for detecting an object that is different from the trailer apparatus arranged in the rear region, the first ultrasonic sensor is operated only for the purpose of receiving echo signals from transmission signals transmitted by at least one other ultrasonic sensor, preventing sending of transmission signals from the first ultrasonic sensor,
wherein the at least one other ultrasonic sensor transmits a transmission signal that is also reflected from the trailer apparatus as a trailer apparatus echo signal, and
wherein the trailer apparatus echo signal is received by the first ultrasonic sensor and is filtered out on evaluation of the echo signals received from an object.

* * * * *